US010380901B2

United States Patent
Deker et al.

(10) Patent No.: US 10,380,901 B2
(45) Date of Patent: Aug. 13, 2019

(54) METHOD FOR AUTOMATICALLY REJOINING A REFERENCE VERTICAL PROFILE OF AN AIRCRAFT

(71) Applicant: THALES, Courbevoie (FR)

(72) Inventors: Guy Deker, Toulouse (FR); Michel Roger, Toulouse (FR)

(73) Assignee: THALES, Courbevoie (FR)

( * ) Notice: Subject to any disclaimer, the term of this patent is extended or adjusted under 35 U.S.C. 154(b) by 135 days.

(21) Appl. No.: 15/492,693

(22) Filed: Apr. 20, 2017

(65) Prior Publication Data
US 2017/0323573 A1    Nov. 9, 2017

(30) Foreign Application Priority Data

May 4, 2016    (FR) ...................................... 16 00740

(51) Int. Cl.
G08G 5/00       (2006.01)
G01C 21/20      (2006.01)
G05D 1/06       (2006.01)
B64D 31/02      (2006.01)
G01C 21/00      (2006.01)

(52) U.S. Cl.
CPC .......... *G08G 5/0047* (2013.01); *B64D 31/02* (2013.01); *G01C 21/00* (2013.01); *G01C 21/20* (2013.01); *G05D 1/0607* (2013.01); *G08G 5/003* (2013.01); *G08G 5/0034* (2013.01); *G08G 5/0039* (2013.01)

(58) Field of Classification Search
None
See application file for complete search history.

(56) References Cited

U.S. PATENT DOCUMENTS

| 6,163,744 | A | 12/2000 | Onken et al. |
| 8,090,531 | B2* | 1/2012 | Goutelard ............. G01C 21/00 701/466 |
| 9,026,275 | B1* | 5/2015 | Young ................... G08G 5/003 701/11 |
| 9,460,629 | B2* | 10/2016 | Chircop ............... G08G 5/0034 |
| 9,852,640 | B2* | 12/2017 | Besada Portas ..... G08G 5/0039 |
| 2015/0120100 | A1 | 4/2015 | Sacle et al. |

FOREIGN PATENT DOCUMENTS

| FR | 2 921 153 A1 | 3/2009 |
| FR | 2 924 505 A1 | 6/2009 |
| FR | 2 983 594 A1 | 6/2013 |
| FR | 3 017 967 A1 | 8/2015 |
| FR | 3 031 175 A1 | 7/2016 |

* cited by examiner

*Primary Examiner* — Rami Khatib
(74) *Attorney, Agent, or Firm* — Baker & Hostetler LLP

(57) ABSTRACT

A method, computer program and system are provided for calculating in an automatic manner a trajectory for rejoining a reference vertical profile of an aircraft. A reference vertical profile comprises a set of vertical constraints, and a method comprises a step of selecting an altitude constraint to be complied with, a step of calculating a vertical-profile prediction making it possible to comply with the constraint, a step of validating the vertical-profile prediction, if the vertical-profile prediction is validated, a step of applying the vertical-profile prediction, otherwise a step of determining the existence of a following altitude constraint to be complied with; if a following altitude constraint exists: a step of selecting a following altitude constraint to be complied with; a return to the step of detecting non-compliance with an altitude constraint; otherwise, a step of applying an exit procedure.

19 Claims, 10 Drawing Sheets

METHOD FOR AUTOMATICALLY REJOINING A REFERENCE VERTICAL PROFILE OF AN AIRCRAFT

CROSS-REFERENCE TO RELATED APPLICATIONS

This application claims priority to foreign French patent application No. FR 1600740, filed on May 4, 2016, the disclosure of which is incorporated by reference in its entirety.

FIELD OF THE INVENTION

The present invention relates to the field of avionics. More specifically, it relates to aircraft trajectory calculation and guidance.

BACKGROUND

In the field of air navigation, an aircraft trajectory comprises a horizontal dimension and a vertical dimension. The skeleton of the horizontal trajectory of an aircraft is called the route which consists of a sequence of flight plan points joined by horizontal segments or legs. Each of these horizontal segments is defined between two waypoints, the final waypoint of a segment also forming the initial waypoint of the following segment of the route. The waypoints may for example be defined by the location of radionavigation beacons, or by geographical coordinates.

Each of the waypoints of the route can be associated with an altitude constraint. These constraints can in particular be of the following types: "AT" indicates that the aircraft must overfly a navigation point at a precise altitude; "AT OR ABOVE" indicates that the aircraft must overfly a navigation point at an altitude at least equal to the given altitude; "AT OR BELOW" indicates that the aircraft must overfly a navigation point at an altitude at most equal to the given altitude; "WINDOW" indicates that the aircraft must overfly the navigation point at an altitude lying in a window lying between a minimum altitude and a maximum altitude. These constraints are termed pointlike, in that they apply only at a point of the trajectory. The set of these constraints constitutes the vertical flight plan. The series of vertical segments linking these vertical constraints is called the reference vertical profile. It is optimized according to the speed constraints of the flight plan and the flight strategy given by the pilot. The rejoining vertical profile is the profile which, starting from the aircraft, will rejoin the reference vertical profile (if the aircraft is not exactly on the latter).

The constraints restricting a vertical profile can also be of a distributed nature. A distributed constraint applies to a vertical flight segment or a sub-part of a flight segment. Such is for example the case for certain descent phases which are subject to constraints of VPPL type (the acronym standing for Vertical Path Performance Limit). The VPPL constraints are in particular formalized by RTCA standard (the acronym standing for Radio Technical Commission for Aeronautics) DO-236C, which defines a lower and upper altitude limit in which an aircraft can fly at any point whilst following a vertical profile.

The calculation of a vertical flight plan for the aircraft is constrained by these altitude constraints. A vertical profile comprises a series of vertical segments making it possible to rejoin altitude constraints at successive given distances from the aircraft. This vertical profile, coupled with the route of the aircraft, makes it possible to define a prediction of the horizontal and vertical position of the aircraft throughout its trajectory.

In the known systems of FMS type, for a given flight plan, the horizontal trajectory on the one hand and the vertical profile on the other hand are produced separately. Initially, a horizontal trajectory is determined on the basis of the horizontal flight plan and of the speeds and flight level of the associated vertical flight plan. Thereafter, a vertical profile is produced, on the basis of the complete vertical flight plan (constraints and presets in the vertical plane) and of the horizontal trajectory. At the output of the vertical profile, the FMS has at its disposal the forecasts of altitude, speed, time, fuel, etc. for each of the points of the flight plan. As the radii of curvature of the lateral trajectory are dependent on the altitude and the aircraft speed, an iteration is performed on the flight plan and the lateral trajectory so as to adjust the angles of curvature (turns), thereby making it possible to obtain a flyable trajectory. This lateral trajectory having been recalculated, a new vertical profile must be generated. Iterations take place until the algorithm converges. In a general manner, the construction of the horizontal trajectory makes it possible to satisfy the contingency constraints of the trajectory, whilst the construction of the vertical profile makes it possible to satisfy the constraints pertaining to the flight domain of the aircraft.

In an optimal manner, the aircraft operates according to a guidance mode called managed mode. In this guidance mode, the position of the aircraft is slaved to a horizontal trajectory and a reference vertical profile. In this mode, the aircraft is slaved to the route. Stated otherwise, guidance laws are applied to the aircraft so that it follows the route gradually.

However, the aircraft may sometimes deviate from the reference trajectory. For example, it may deviate from the reference trajectory if the air traffic control instructs it to do so for safety reasons. It may also be correctly slaved to its horizontal trajectory, but not to its vertical profile. Such is for example the case when an unanticipated tailwind deflects the aircraft slightly from its trajectory, and when the forecasts recalculated on the vertical flight segments initially calculated while taking account of this situation no longer comply with the vertical constraints to which the trajectory of the aircraft is subject. Such is also the case when a modification of the horizontal flight plan arises, and when the recalculated forecasts no longer correspond to the constraints associated with the aircraft's various navigation points. Such is again the case when a manual lateral guidance instruction disengages the mode for automatic following of the vertical profile and causes the aircraft to diverge from the latter. Finally, in an upgrade of the guidance function, it may no longer be slaved to its lateral trajectory, but continue to be slaved to the vertical profile recalculated on the basis of the lateral rejoining trajectory, as disclosed for example in patent FR 2924505.

In this case, the predicted vertical profile of the aircraft may no longer comply with certain altitude constraints, and must therefore be adapted.

A first method consists in recalculating a complete vertical profile. This method is for example described in document FR2983594 and exhibits the drawback of being lengthy to implement. Moreover, a complete recalculation of the vertical profile may significantly modify the vertical profile of the aircraft (for example, modify the orders of the flight phases, the cruise altitude etc.), these modifications possibly being difficult for the air traffic control to manage when the air traffic is dense, and disturbing for the crew of an aircraft with the heavily modified vertical profile.

The object of the invention is to exceed the limits of the prior art, by proposing a scheme for automatically adapting a vertical trajectory, allowing an aircraft, when its vertical trajectory no longer complies with the vertical constraints restricting them, to adapt the trajectory so as to rejoin a reference vertical profile as quickly as possible, while complying with the flight domain of the aircraft.

SUMMARY OF THE INVENTION

For this purpose, the invention relates to a method for automatically adapting the vertical profile of an aircraft comprising: a step of selecting an altitude constraint to be complied with; a step of calculating a vertical-profile prediction making it possible to comply with said altitude constraint; a step of validating the vertical-profile prediction; if the vertical-profile prediction is validated, a step of assigning the vertical-profile prediction; otherwise: a step of determining the existence of a following altitude constraint to be complied with; if a following altitude constraint exists: a step of selecting a following altitude constraint to be complied with; a return to the step of calculating a vertical-profile prediction making it possible to comply with said altitude constraint; otherwise, a step of applying an exit procedure.

Advantageously, the method comprises, prior to the step of selecting an altitude constraint to be complied with, a step of selecting a horizontal trajectory.

Advantageously, the step of selecting the horizontal trajectory comprises the selecting of the active lateral trajectory if managed lateral guidance is engaged, or the selecting of a rejoining trajectory if managed lateral guidance is not engaged.

Advantageously, the step of validating the vertical-profile prediction comprises a sub-step of validating compliance with the altitude constraint according to said vertical-profile prediction.

Advantageously, the step of validating the vertical-profile prediction comprises a sub-step of validating the rejoining of the reference vertical profile, at the latest at the altitude constraint.

Advantageously, the exit procedure comprises the calculation of a last vertical-profile prediction, said last vertical-profile prediction consisting: if the aircraft is in a climb phase, in a prediction in respect of rejoining the cruise altitude; if the aircraft is in a descent or approach phase, in a prediction in respect of rejoining a final approach point.

Advantageously, said altitude constraint to be complied with is a pointlike constraint.

Advantageously, the altitude constraint is a pointlike constraint marking the end of a vertical climb segment, and the step of calculating a vertical-profile prediction making it possible to comply with said altitude constraint is performed according to a flight preset prediction comprising: if a predicted altitude of the aircraft is greater than said altitude constraint, a continuing of the climb up to the altitude of the constraint followed by a dwelling of the aircraft as long as the altitude constraint is ahead of the aircraft; if a predicted altitude of the aircraft is less than said altitude constraint: an increase of the engine thrust up to a value making it possible to comply with said altitude constraint or a maximum permissible value of the continuous engine thrust; if the increase of the engine thrust does not make it possible to comply with said altitude constraint, and if the speed-wise guidance mode is the managed mode, a reducing of the speed of the aircraft until obtaining a value of slope which makes it possible to comply with or to pass as close as possible to said altitude constraint, or a minimum permissible value of the speed of the aircraft.

Advantageously, said altitude constraint is a pointlike constraint marking the end of a vertical cruise segment, and the step of calculating a vertical-profile prediction making it possible to comply with said constraint is performed according to a flight preset prediction comprising: if the altitude of the aircraft is situated above said altitude constraint, the calculation of a flight preset comprising the maintaining of the current horizontal speed, and a predefined negative vertical speed; if the altitude of the aircraft is situated below said altitude constraint: a prediction of engine thrust at a maximum permissible value of a continuous thrust; a preset for maintaining the current horizontal speed.

Advantageously, said altitude constraint to be complied with is a distributed constraint spread over at least one sub-part of a vertical segment.

Advantageously, said altitude constraint is of VPPL type.

Advantageously, said altitude constraint is a pointlike constraint or a distributed constraint spread over a vertical descent segment, and the step of calculating a vertical-profile prediction making it possible to comply with said altitude constraint is performed according to a flight preset prediction comprising: if the current or predicted position of the aircraft is situated above said altitude constraint, the transition from the current configuration to a configuration for rejoining, said transition being performed at constant load factor and the configuration for rejoining being characterized by: a minimum thrust preset; a preset of semi-extension of the airbrakes; if the current or predicted position of the aircraft is situated below said altitude constraint: a preset of transition at constant vertical speed; a preset from among a preset of smooth aerodynamic configuration and of aerodynamic configuration used to calculate a reference vertical profile in descent.

Advantageously, the step of validating compliance with the altitude constraint by the vertical-profile prediction comprises the calculation of a deviation between an altitude predicted on the vertical-profile prediction and an altitude predicted on the reference vertical profile in descent.

Advantageously, compliance with said altitude constraint is not validated if the deviation between the altitude predicted on the vertical-profile prediction and the altitude predicted on the reference vertical profile in descent is greater than a predefined threshold.

Advantageously, compliance with said altitude constraint is not validated if the altitude of the aircraft is situated outside of a safety margin with respect to the reference vertical profile in descent defined by a constraint of VPPL type.

Advantageously, the method comprises, when compliance with said altitude constraint is not validated: a step of applying the vertical-profile prediction calculated in the step of calculating a vertical-profile prediction making it possible to comply with said altitude constraint; a storing of vertical-profile prediction until said altitude constraint; a reusing of a predicted state of the aircraft at said altitude constraint, according to the vertical-profile prediction stored during the return to the step of calculating a prediction of a flight preset making it possible to comply with the constraint.

The invention also relates to a trajectory calculation system comprising a processor configured to perform an automatic adaptation of a vertical profile of an aircraft, said adaptation comprising at least: a step of selecting an altitude constraint to be complied with; a step of calculating a vertical-profile prediction making it possible to comply with said altitude constraint; a step of validating the vertical-profile prediction; if compliance with the vertical-profile prediction is validated, a step of assigning the vertical-profile prediction; otherwise: a step of determining the existence of a following altitude constraint to be complied with; if a following altitude constraint exists: a step of selecting a following altitude constraint to be complied with; a return to the step of calculating a vertical-profile prediction making it possible to comply with said altitude constraint; otherwise, a step of applying an exit procedure.

The invention also relates to a computer program product comprising program code instructions recorded on a computer-readable medium for automatically adapting a vertical profile of an aircraft when said program operates on a computer, said program code instructions being configured to: select an altitude constraint to be complied with; calculate a vertical-profile prediction making it possible to comply with said altitude constraint; validate the vertical-profile prediction; if the vertical-profile prediction is validated, assign the vertical-profile prediction; if the vertical-profile prediction is not validated: determine the existence of a following altitude constraint to be complied with; if a following altitude constraint exists: select a following altitude constraint to be complied with; execute said computer code elements configured to calculate vertical-profile prediction making it possible to comply with said altitude constraint; if a following altitude constraint does not exist, execute an exit procedure.

The invention makes it possible to prepare and update, automatically, an optimal and flyable vertical profile of an aircraft, subsequent to an intentional or unintentional loss of slaving of the reference vertical profile or of the horizontal flight plan during changes of the flight environment of the aircraft or in case of instruction of the air traffic controller to follow a manual preset.

The invention makes it possible to prepare and update, automatically, an optimal and flyable vertical profile of an aircraft immediately available for slaving, subsequent to a request by the pilot or the air traffic controller to resume and follow the reference vertical profile.

The invention makes it possible, in cases where a vertical profile must be recalculated, to have an updated vertical profile which best complies with the existing constraints of the vertical flight plan.

The invention allows an aircraft crew to have, permanently, a reliable and continuous vertical profile until the destination.

BRIEF DESCRIPTION OF THE DRAWINGS

Other characteristics will become apparent on reading the following nonlimiting detailed description given by way of example, in conjunction with appended drawings which represent.

Certain acronyms commonly used in the technical field of the present patent application may be employed in the course of the description. These acronyms are listed in the table hereinbelow, with in particular their expression and their meaning.

| Acronym | Expression | Meaning |
| --- | --- | --- |
| DB | DataBase | Database. Container making it possible to store and retrieve all of the information relating to an activity. Is generally in a computerized form. |
| FAF | Final Approach Fix | Final point of the approach procedure |
| FMD | Flight Management Display | Display in a cockpit of Flight Management data in the form of pages or windows. System for displaying data provided by an FMS system |
| FMS | Flight Management System | Computerized system making it possible to calculate flight plans, as well as a lateral trajectory, a vertical profile and predictions associated with each flight plan, and to provide the guidance presets suitable for the automatic pilot so as to follow the calculated lateral and vertical trajectory. |
| FPLN | Flight PLaN | Flight Plan. Set of geographical elements making up the skeleton of the trajectory of an aircraft. A flight plan includes in particular a departure airport, an arrival airport, procedures and waypoints. The vertical flight plan includes one or more flight levels, one or more optimum speeds and vertical constraints. |
| KCCU | Keyboard Console Control Unit | Keyboard Cursor Control Unit. Man-Machine Interface able to be integrated into a cockpit comprising a keyboard so that the pilot can re-enter information into the FMS. |
| MCDU | Multipurpose Control Display Unit | Multifunction Display Unit. Man-Machine Interface able to be integrated into a cockpit allowing the display and the inputting of a considerable amount of information related to the FMS. |
| ND | Navigation Display | Navigation Screen. Cockpit display element presenting the lateral flight trajectory. |
| RTCA | Radio Technical Commission for Aeronautics | American organization developing technical standards in the field of aeronautics. |
| VD | Vertical Display | Display element able to be integrated into a cockpit, and displaying the reference profile and the vertical rejoining profile of the aircraft. |
| VPPL | Vertical Path Performance Limit | Margin of tolerance in altitude for the descent trajectory of an aircraft, defined by standard DO236. |

DETAILED DESCRIPTION

Figure 1:
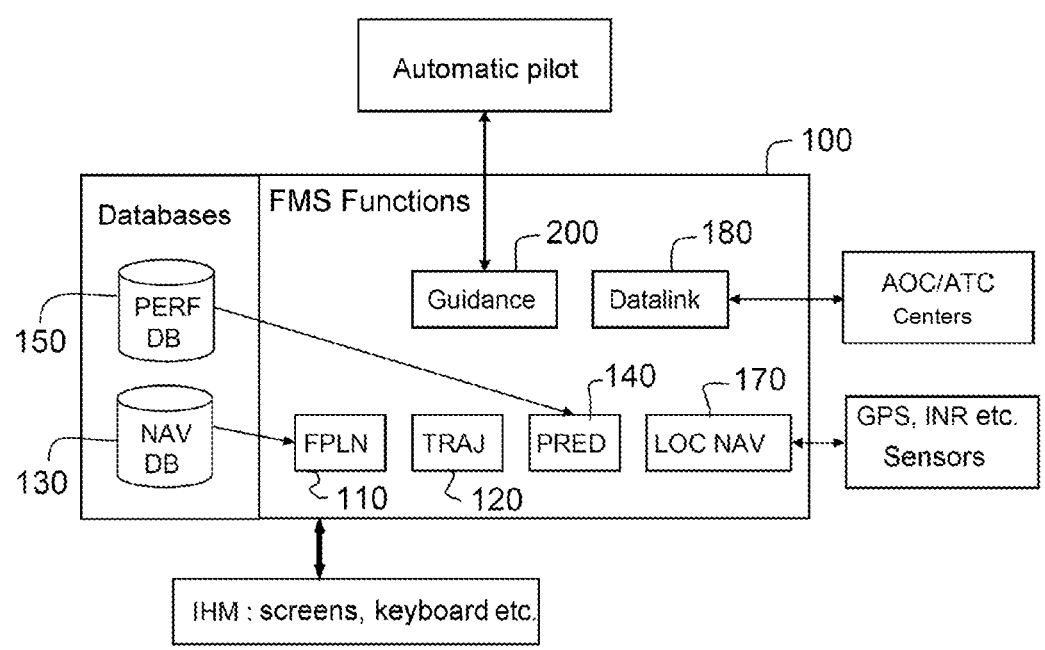
FIG. 1, an FMS system according to the prior art.

FIG. 1 represents a known system of FMS type of the prior art.

A flight management system can be implemented by at least one calculator embedded aboard the aircraft. The FMS 100 determines in particular a geometry of a flight plan profile followed by the aircraft. The trajectory is calculated in four dimensions: three spatial dimensions and a time/speed profile dimension. The FMS 100 also transmits to a pilot, via a first pilot interface, or to an automatic pilot, guidance presets calculated by the FMS 100 so as to follow the flight profile.

A flight management system can comprise one or more databases such as the database PERF DB 150, and the database NAV DB 130. The databases PERF DB 150 and NAV DB 130 comprise respectively aircraft performance data and air navigation data, such as routes and beacons.

The management of a flight plan according to the prior art can call upon means for flight plan creation/modification by the crew of the aircraft through one or more man-machine interfaces, for example:
- an MCDU;
- a KCCU;
- an FMD;
- an ND;
- a VD.

A capability of the FMS 100 is the flight plan management function 110, usually named FPLN. The FPLN capability 110 allows, in particular, management of various geographical elements making up a skeleton of a route to be followed by the aircraft comprising: a departure airport, waypoints, airways to be followed, an arrival airport. The FPLN capability 110 also allows management of various procedures forming part of a flight plan such as: a departure procedure, an arrival procedure, one or more standby procedures. The FPLN capability 110 allows in particular the creation, the modification, the deletion of a primary or secondary flight plan.

The flight plan and its various items of information related in particular to the corresponding trajectory calculated by the FMS can be displayed for consultation on the part of the crew by display devices, also called man-machine interfaces, present in the cockpit of the aircraft such as an FMD, an ND, a VD. The VD displays in particular a vertical flight profile.

The FPLN capability 110 calls upon data stored in databases PERF DB 150 and NAV DB 130 to construct a flight plan and the associated trajectory. For example, the database PERF DB 150 can comprise aerodynamic parameters of the aircraft, or else characteristics of the engines of the aircraft. It contains in particular the performance margins routinely applied in the prior art to guarantee safety margins in the descent and approach phases. The database NAV DB 130 may for example comprise the following elements: geographical points, beacons, airways, departure procedures, arrival procedures and altitude, speed or slope constraints.

A capability of the FMS, named TRAJ 120 in FIG. 1, makes it possible to calculate a lateral trajectory for the flight plan defined by the FPLN capability 110. The TRAJ capability 120 constructs in particular a continuous trajectory on the basis of points of an initial flight plan while complying with the aircraft performance ratings provided by the database PERF DB 150. The initial flight plan can be an active, temporary, or secondary flight plan. The continuous trajectory can be presented to the pilot by means of one of the man-machine interfaces.

A capability of the FMS 100 is the trajectory prediction function PRED 140. The prediction function PRED 140 constructs in particular a vertical profile optimized on the basis of the lateral trajectory of the aircraft, provided by the function TRAJ 120. To this end, the prediction function PRED 140 uses the data of the first database PERF DB 150. The vertical profile can be presented to the pilot by means for example of a VD.

A capability of the FMS 100 is the location function 3, named LOCNAV 170 in FIG. 1. The function LOCNAV 170 performs, in particular, optimized geographical location, in real time, of the aircraft as a function of geolocation means embedded aboard the aircraft.

A capability of the FMS 100 is the data link function, named DATA LINK 180 in FIG. 1. The DATA LINK function 180 makes it possible to exchange data with other aircraft or operators on the ground, for example to transmit a predicted trajectory of the aircraft, or receive constraints on the trajectory, for example the predicted position of other aircraft or altitude constraints.

A capability of the FMS 100 is the guidance function 200. The guidance function 200 provides in particular the automatic pilot or one of the man-machine interfaces with appropriate controls making it possible to guide the aircraft in lateral and vertical geographical planes (altitude and speed) so that said aircraft follows the trajectory provided in the initial flight plan.

Figure 2A:
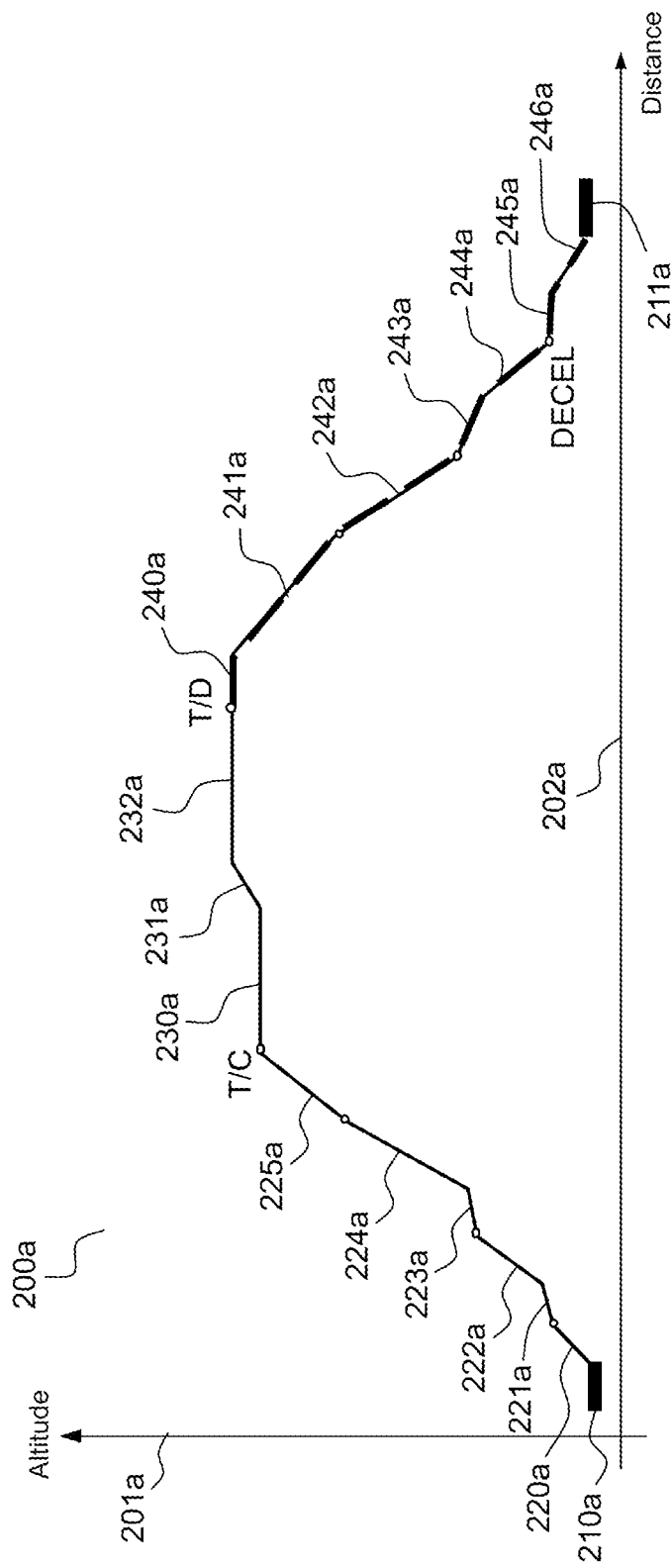
FIGS. 2a and 2b, two examples of vertical constraints for the creation of a flight plan, respectively for pointlike constraints separating climb, cruise and descent phases of a vertical flight plan, and for distributed constraints spread over a descent phase.
Figure 2B:
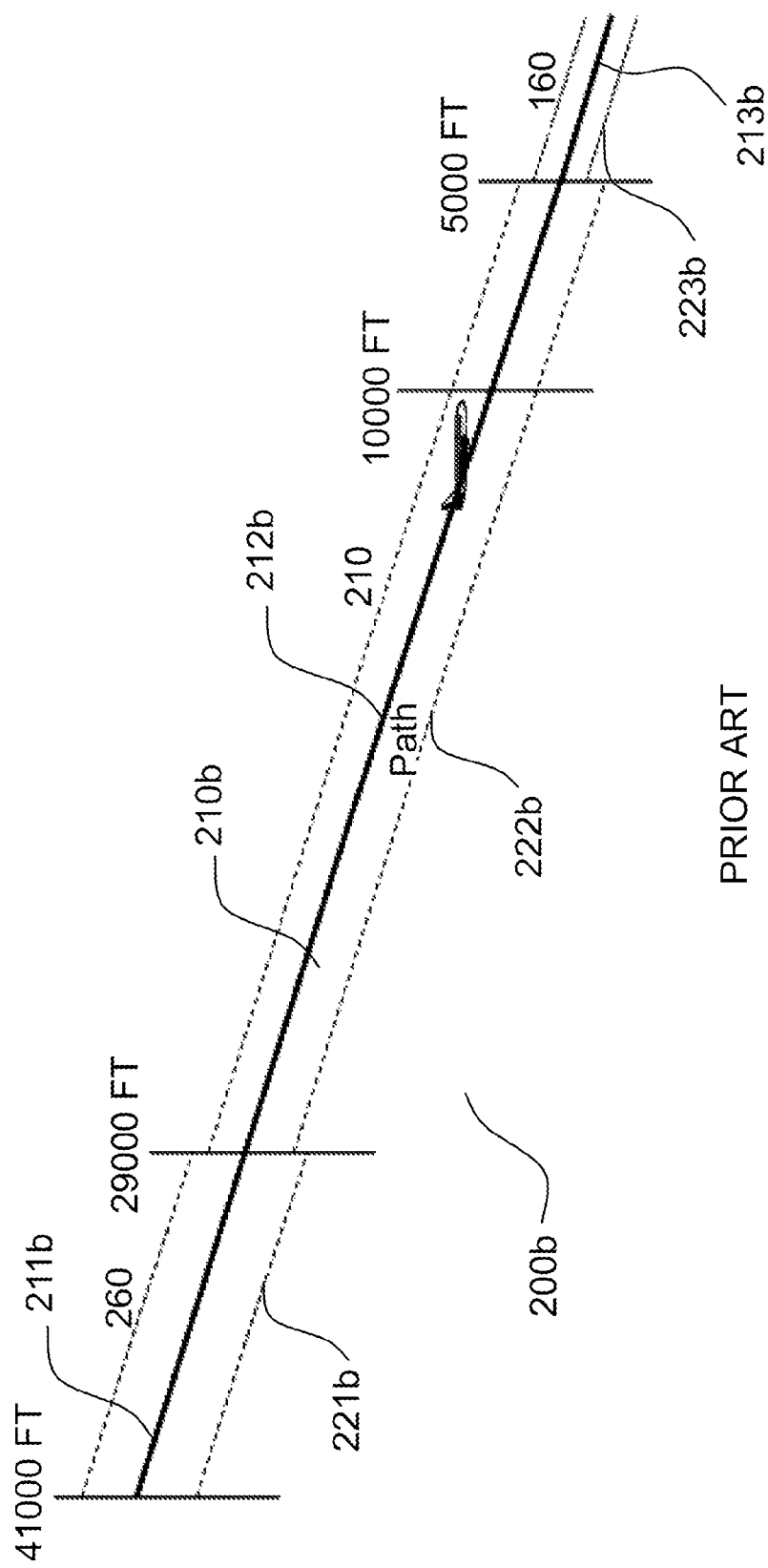

FIGS. 2a and 2b represent two examples of vertical constraints for the creation of the vertical profile, respectively for discrete altitude constraints, on points of the flight plan, distributed according to climb, cruise and descent phases of a vertical flight plan, and for continuous confinement constraints distributed over a descent phase.

FIG. 2a represents an example of discrete vertical altitude constraints distributed according to climb, cruise and descent phases of a vertical profile.

These various constraints define a vertical altitude profile 200a for an aircraft trajectory. This profile represents the planned altitude of the aircraft, displayed on the vertical axis 201a, as a function of the distance travelled since takeoff, displayed on the horizontal axis 202a. This vertical profile begins at the takeoff point 210a and ends at the landing point 211a.

This vertical profile is formed of several successive vertical flight segments. The segments 220a (initial climb), 221a (acceleration to the limited climb speed), 222a (climb at limited climb speed), 223a (acceleration to the optimal climb speed), 224a (climb at optimal speed under CAS reference) and 225a (climb at optimal speed under Mach reference) make up the aircraft's climb. The flight segments 230a (initial cruise level), 231a (climb step) and 232a (intermediate or final cruise level) make up the cruise. Finally, the flight segments 240a (deceleration segment from the cruise speed to the optimal descent speed), 241a (descent at optimal speed under Mach reference), 242a (descent at optimal speed under CAS reference), 243a (deceleration to the limited descent speed), 244a (descent at limited descent speed), 245a (deceleration segment to the landing speed) and 246a (final approach segment) make up the descent.

These vertical segments are constructed so as to comply with pointlike altitude constraints. The altitude constraints may stem from operational constraints. For example, the following altitude constraints may apply at given navigation points on the route of the aircraft: "AT" indicates that the aircraft must overfly a navigation point at a precise altitude; "AT OR ABOVE" indicates that the aircraft must overfly a navigation point at an altitude at least equal to the given altitude; "AT OR BELOW" indicates that the aircraft must overfly a navigation point at an altitude at most equal to the given altitude; "WINDOW" indicates that the aircraft must overfly the navigation point at an altitude lying in a window comprising a minimum altitude and a maximum altitude.

FIG. 2b represents a second example of vertical constraints, distributed over a descent phase.

This figure represents a set of constraints 200b pertaining to a reference vertical profile segment in descent 210b. The vertical navigation tolerance VPPL, described in particular by RTCA standard DO-236C, defines vertical margins above and below a reference segment 210b that an aircraft must comply with in the approach. The margins defined in RTCA standard DO-236C depend on the altitude of the aircraft:

on a subset 211b of the reference segment situated between 41000 and 29000 feet in altitude, the permissible margin for the altitude of the aircraft is 260 feet, and the vertical trajectory of the aircraft must lie in a vertical corridor 221b of 260 feet above and below the subset 211b of the vertical reference segment;

on a subset 212b of the reference segment situated between 29000 and 5000 feet in altitude, the permissible margin for the altitude of the aircraft is 210 feet, and the vertical trajectory of the aircraft must lie in a vertical corridor 222b of 210 feet above and below the vertical reference segment subset 212b;

on a subset 213b of the reference segment situated below 5000 feet in altitude, the permissible margin for the altitude of the aircraft is 210 feet, and the vertical trajectory of the aircraft must lie in a vertical corridor 223b of 160 feet above and below the vertical reference segment subset 213b.

This standard therefore defines, for each point of a vertical profile below 41000 feet in altitude, a minimum and maximum altitude at which the aircraft must be situated, thus defining a distributed continuous altitude constraint for a descent profile.

Figure 3A:
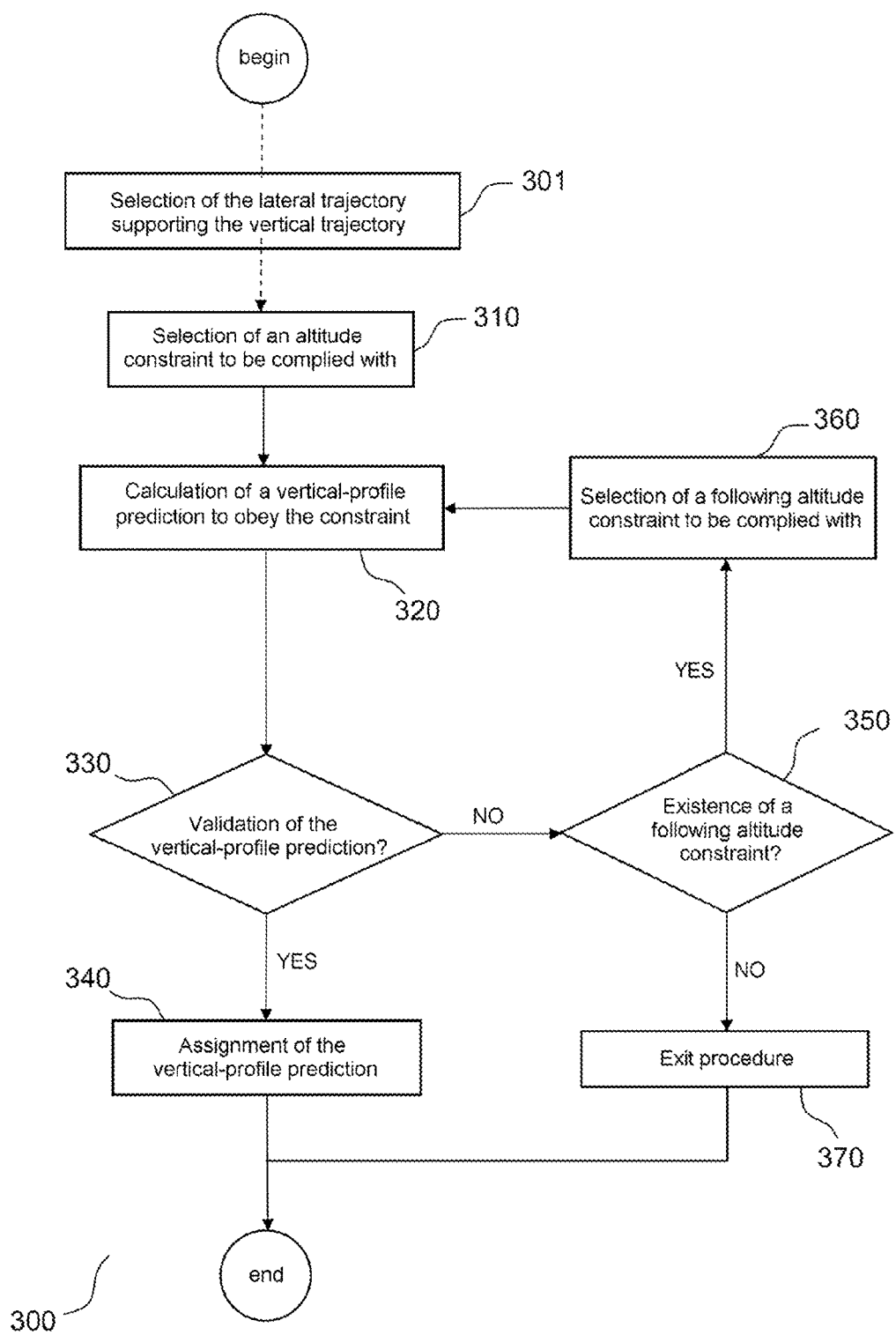
FIGS. 3a and 3b, two examples of flow charts of a method according to various embodiments of the invention.
Figure 3B:
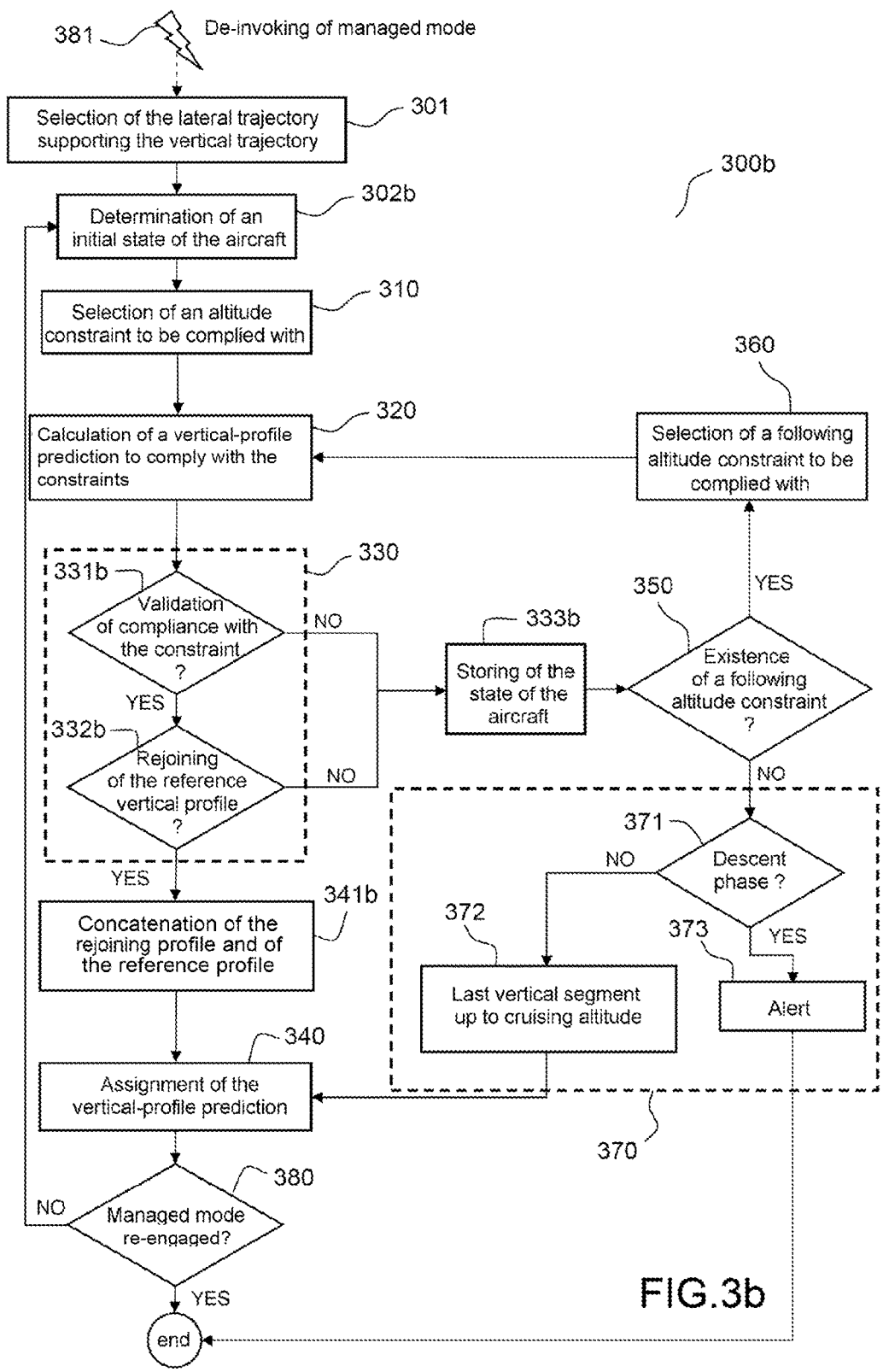

FIGS. 3a and 3b represent two examples of flow charts of a method according to various embodiments of the invention.

FIG. 3a represents a flow chart of a method according to one embodiment of the invention.

A method 300 according to the invention is a method for automatically adapting the vertical profile of an aircraft. This adapting of the vertical profile may for example be performed in a "TRAJ" module 120 of an FMS 100.

In a set of embodiments of the invention, the method is executed upon the occurrence of an event. For example, the method can be executed if an altitude deviation with a reference vertical profile is detected. The method can also be executed if the managed guidance mode of the aircraft is deactivated, during a modification of the vertical flight plan of the aircraft, or on command of a pilot of the aircraft. According to certain embodiments of the invention, the method can also be executed in an iterative manner. For example, it can be re-executed upon each occurrence of a periodic event, for example, as long as the aircraft has not returned to a managed vertical guidance mode.

The method according to the invention can be implemented to adapt a vertical profile of an aircraft when an initially calculated profile is no longer optimal, for example when an unanticipated event causes the aircraft to deviate appreciably from the initially anticipated profile, such as an unanticipated tailwind.

In one embodiment of the invention, the horizontal trajectory is updated continuously, and the adaptation of the vertical profile is performed on this horizontal trajectory.

In other embodiments of the invention, the method 300 can comprise a step 301 of selecting the lateral trajectory supporting the vertical profile. For example, this step 301 can comprise the selection of the active lateral trajectory if managed lateral guidance is engaged, or a rejoining trajectory if managed lateral guidance is not engaged.

It may also be necessary to adapt the vertical profile subsequent to a modification of the horizontal trajectory of an aircraft, the vertical profile then no longer being in agreement with the modified horizontal trajectory of the aircraft. A modification of the horizontal trajectory of the aircraft may for example be obtained by applying the method described in patent application FR1403023.

The method according to the invention can also be invoked when a significant altitude deviation, for example exceeding the VPPL tolerances, with respect to a reference vertical profile is detected, or when the managed vertical mode is deactivated when the pilot decides to interrupt the slaving of this reference vertical profile, or even subsequent to the interruption of slaving of the lateral trajectory (rendering the reference vertical profile null and void) subsequent for example to a tactical instruction of the air traffic controller.

The adaptation of the vertical profile of the aircraft can be performed according to various modalities. For example, it can consist of a complete re-calculation of a vertical profile, or of a subset of a vertical profile of an aircraft. According to one embodiment of the invention, the adaptation of the predicted vertical profile of the aircraft consists in calculating a rejoining vertical profile towards the reference vertical profile of the aircraft, and then in defining the predicted vertical profile of the aircraft as the concatenation of the rejoining profile until the rejoining point, with the reference vertical profile from the rejoining point.

The method 300 according to the invention comprises a step 310 of selecting an altitude constraint to be complied with.

In a set of embodiments of the invention, the selection of an altitude constraint, and the subsequent calculation of flight presets, are performed on the basis of the current state of the aircraft.

In other embodiments of the invention, the selection of an altitude constraint, and the subsequent calculation of flight presets, are performed on the basis of a predicted state of the aircraft, for example the predicted initial state of the aircraft propagated according to the current guidance preset for a predefined duration after the instant of the calculation.

According to a set of embodiments of the invention, the method 300 therefore comprises, prior to step 310 of selecting a next altitude constraint to be complied with, a step of determining a predicted initial state of the aircraft. This step of determining a predicted initial state of the aircraft can comprise the determination of the state of the aircraft at a predefined time horizon, for example 10 seconds, according to the current guidance preset.

In a preferred embodiment of the invention, step 310 consists in selecting the next altitude constraint encountered by the aircraft on its vertical profile. In other embodiments of the invention, said altitude constraint to be complied with can be chosen in an arbitrary manner, or by discarding the next altitude constraints. According to various nonlimiting embodiments of the invention, the constraint can be a pointlike constraint, a distributed constraint, a constraint of type "AT", "AT OR ABOVE", "AT OR BELOW" or else "WINDOW".

In a set of embodiments of the invention, step 310 consists in selecting, from among a set of vertical constraints, the vertical constraint closest to the aircraft, which has not yet been exceeded, that is to say sequenced, in distance. In other embodiments of the invention, only certain constraints are taken into account depending on whether the aircraft is in the climb phase or in the descent phase.

For example, it may be possible in certain embodiments of the invention to take account only of the constraints of type "BELOW", "AT", "AT OR BELOW" or of the "BELOW" part of a "WINDOW" constraint in the climb phase. Indeed, in an embodiment in which the aircraft climbs as quickly as possible up to a cruise altitude, a constraint of "ABOVE" type will have no effect on the construction of the rejoining vertical profile.

Conversely, in an embodiment in which the aircraft is in the descent phase, and in which the descent segments are constructed with an descent as quickly as possible descent phase and then a dwell phase, it will be possible for step 310 to take account of the "ABOVE", "AT", "AT OR ABOVE" constraints alone, or of the "ABOVE" part of "WINDOW" constraints. Indeed, the constraints of "BELOW" type will have no impact on the construction of rejoining vertical profiles of this type. The method 300 comprises, if non-compliance with the constraint is detected, a step 320 of calculating a guidance preset making it possible to comply with the constraint. This step consists in modifying the aircraft's vertical-profile prediction, so as to comply with the altitude constraint, while remaining in the flight domain of the aircraft. Numerous ways of determining a vertical-profile prediction are possible. Calculation schemes will be described according to various embodiments of the invention discussed with respect to FIGS. 4a, 4b, 4c, 5 and 6.

Step 320 consists in validating that the vertical-profile prediction validates one or more objectives, at the latest at the selected altitude constraint. Various possible embodiments of the validation of the vertical-profile prediction will be described with reference to FIG. 3b. The vertical-profile prediction can in particular be validated if it makes it possible to comply with the vertical constraint, and/or if it makes it possible to rejoin a reference vertical profile at the latest at the constraint.

Step 320 is followed by a step 330 of validating the vertical-profile prediction.

If compliance with the constraint is validated, the method comprises a step 340 of assigning the calculated vertical-profile prediction. This step consists in applying the predicted vertical-profile prediction, so that the profile followed by the aircraft validates the flight constraint. Various embodiments of step 340 are possible. For example, step 340 of assigning the vertical-profile prediction can comprise the dispatching of the vertical-profile prediction to an automatic pilot so that the latter slaves the trajectory of the aircraft to the calculated vertical profile.

Step 340 of assigning the vertical-profile prediction can also comprise the displaying of the predicted vertical profile to a pilot of the aircraft, thereby allowing the pilot of the aircraft to manually follow the predicted vertical profile thus defined. The displaying of the predicted vertical profile can be accompanied by a set of information items. For example, the displaying of the predicted vertical profile may comprise the displaying of the vertical constraints complied with or not, but also the displaying of various predicted data along the vertical trajectory, for example the fuel level of the aircraft, the speed and the altitude of the aircraft, as well as any other information useful to the pilot at various points of the vertical profile. Display can be carried out in accordance with various colours. For example, a complied with constraint can be displayed in green, whilst a non-complied with constraint can be displayed in amber.

On completion of step 340, the following of the predicted vertical profile can be performed by a sequence of presets given by the pilot in non-managed mode or directly by the automatic pilot when the aircraft is in managed mode. In one set of embodiments of the invention, the method 300 comprises, on completion of step 340 of assigning the vertical-profile prediction, the programming of a periodic event of re-calculating the vertical profile. For example, on completion of a predefined duration, for example 5 or 10 seconds, if the aircraft has not switched back to managed mode and/or if it has not rejoined a vertical profile of preference, the method can be re-executed from step 301 or from step 310. This makes it possible to periodically re-adapt the vertical profile or the rejoining vertical profile if the latter has not been followed precisely, until the aircraft switches back to managed vertical guidance mode.

If compliance with the constraint is not validated, the method 300 comprises a step 350 of determining the existence of a following altitude constraint to be complied with. This step consists in verifying whether following altitude constraints exist on the profile of the aircraft. In a preferred embodiment of the invention, the altitude constraints are arranged in the order defined by the lateral trajectory of the aircraft, and the existence of a following altitude constraint to be complied with is validated except if the selected altitude constraint was the last one of the trajectory. In one set of embodiments of the invention, certain constraints might not be taken into account, either because they will have no impact on the construction of the vertical profile, or because they are considered to be already non-complied with, according to the same criteria as in step 310.

If a following altitude constraint exists, the method 300 comprises a step 360 of selecting a following altitude constraint to be complied with. In a preferred embodiment of the invention, the altitude constraints are ordered following the direction of travel of the lateral trajectory, and the following altitude constraint according to this order is selected. On completion of the selection of the following altitude constraint, step 320 is reactivated to validate whether this new constraint is complied with.

If, on completion of step 360, no following altitude constraint is identified, an exit procedure 370 is activated. This exit procedure makes it possible, according to various embodiments of the invention, to warn the pilot that the vertical altitude constraints will not be able to be satisfied, and/or to recalculate the vertical profile of the aircraft in a more global manner.

According to the various embodiments of the invention, the exit procedure may for example consist of:
  A cockpit alert;
  A calculation of a last vertical segment;
  A modification of the vertical constraints restricting the profile of the aircraft;
  A recalculation of the horizontal trajectory of the aircraft, for example by means of the scheme described by patent FR1403023.

Step 320 of calculating a vertical-profile prediction can be performed on the initial altitude constraint, selected in step 310, or on a following constraint, selected in step 360. According to various embodiments of the invention, the calculation of a vertical-profile prediction so as to comply with a constraint selected in step 360 can be performed according to the position and the current flight preset of the aircraft.

In other embodiments of the invention, the vertical profile predicted in step 320 is saved until the current constraint at each iteration, even if it does not allow the constraint to be complied with. The calculation of a vertical-profile prediction iteration in step 320 of the following iteration then begins at the point where the previous constraint is exerted, according to the predicted state of the aircraft at this point.

In a set of embodiments of the invention, the method 300 is re-executed periodically until the aircraft has rejoined its reference vertical profile or until the managed vertical mode is re-engaged.

The scheme 300 according to the invention makes it possible advantageously to update and have available, permanently, a vertical profile of an aircraft making it possible to re-invoke a mode for rejoining and following as closely as possible a reference vertical profile.

FIG. 3b represents a flow chart of a method 300b according to other embodiments of the invention.

The method 300b is more particularly intended for the rejoining of a reference vertical profile from which the aircraft has deviated. The method 300b consists in calculating a so-called rejoining vertical profile for rejoining the reference profile, and then defining the vertical profile of the aircraft as the rejoining profile until the rejoining point, and then the reference vertical profile after.

The method 300b is executed upon the occurrence of an event manifested for example by the disengaging of the aircraft from a managed vertical guidance mode and/or if an altitude deviation with a reference vertical profile is detected. The method can also be executed if the managed lateral guidance mode of the aircraft is deactivated, during a modification of the aircraft's flight plan, or on command of a pilot of the aircraft. According to certain embodiments of the invention, the method can also be executed in an iterative manner.

The method 300b comprises all the steps of the method 300. It comprises, prior to step 310 of selecting a constraint to be complied with, a step 302b of determining an initial state of the aircraft. In one embodiment of the invention, step 302b consists in determining the predicted state of the aircraft at a predefined temporal horizon, according to the current guidance preset.

This temporal horizon makes it possible, in the case where the managed vertical mode is engaged on the rejoining profile, to have a rejoining profile which does not start behind the aircraft. According to various embodiments of the invention, this duration can be fixed and predefined, for example 5 or 10 seconds. In other embodiments of the invention, this duration can be variable, taking account of the speed of the aircraft and of an estimated time of complete calculation of the rejoining vertical profile according to the method 300 or 300b.

In a set of embodiments of the invention, this duration therefore corresponds to the minimum between a variable duration calculated, for example, as a function of the estimated duration of rejoining of the reference vertical profile, and a fixed duration, corresponding to a minimum duration of re-calculation of the rejoining vertical profile.

In the method 300b, step 330 of validating the vertical-profile prediction comprises two sub-steps:
A first sub-step 331b of validating compliance with the altitude constraint according to the vertical-profile prediction;
A second sub-step 332b of validating the rejoining of the reference vertical profile, at the latest at the altitude constraint.

The first sub-step 331b of validating compliance with the altitude constraint according to the vertical-profile prediction consists in verifying whether, by applying the vertical-profile prediction calculated in step 320, the aircraft will be able to comply with the altitude constraint. If yes, the second sub-step 332b of validating the rejoining of the reference vertical profile, at the latest at the altitude constraint, is activated. The second sub-step 332b of validating the rejoining of the reference vertical profile, at the latest at the altitude constraint consists in verifying whether the vertical profile makes it possible to rejoin the reference vertical profile at the latest at the altitude constraint. If the rejoining of the reference vertical profile at the latest at the altitude constraint is validated, a step 341b of concatenating the rejoining profile and the reference vertical profile is activated.

Step 341b of concatenating the rejoining vertical profile and the reference vertical profile consists in forming a single vertical profile, comprising the vertical profile segments calculated in step 320 (rejoining vertical profile) until the reference vertical profile rejoining point, and then the remaining elements of the reference vertical profile. On completion of step 341b, step 340 of assigning the vertical-profile prediction so as to follow the vertical profile is activated.

The combination of the two sub-steps 331b and 332b makes it possible to assign the vertical-profile prediction only from the moment the calculated vertical profile makes it possible at one and the same time to comply with the current constraint, and to rejoin the reference vertical profile. If compliance with the altitude constraint is not validated in step 331b, or if the rejoining of the reference vertical profile at the latest at the constraint is not validated in step 332b, a step 333b of storing vertical-profile prediction as far as the constraint is activated.

Step 333b of storing the vertical-profile prediction of the aircraft until the constraint consists in storing the predicted state of the vertical trajectory of the aircraft up to the level of the current vertical constraint. The following execution of step 320 of calculating a vertical-profile prediction will then take as initial state of the aircraft for the calculation of vertical-profile prediction for rejoining the following altitude constraint the predicted state of the aircraft at the constraint, according to the stored vertical-profile prediction.

In the method 300b, step 370 of applying an exit procedure comprises a sub-step 371 of determining whether the aircraft is in a descent phase, and then:
If the aircraft is not in a descent phase, a sub-step 372 of calculating a last vertical segment for rejoining the cruise altitude, and then step 340 of assigning the vertical-profile prediction;
If the aircraft is in a descent phase, a step 373 of alerting the pilot.

If the aircraft is not in a descent phase, and if there is no longer any following altitude constraint to be complied with, sub-step 372 makes it possible to calculate a last segment for rejoining the cruise altitude. If the aircraft is in a climb phase, this may entail a calculation of a segment for rejoining the cruise altitude as quickly as possible.

If the aircraft is in a descent phase and if there is no longer any following altitude constraint to be complied with, the alert sub-step 373 makes it possible to alert the pilot to the fact that it is not possible to construct a vertical profile making it possible to comply with the last constraint, and therefore to rejoin the final point of the approach or Final Approach Fix (FAF). In other embodiments of the invention, other operations are possible when the aircraft is in the descent phase and when there is no longer any following altitude constraint. For example, a complete trajectory can be re-calculated, or a specific rejoining trajectory can be invoked.

In one embodiment of the invention, step 340 consists in preparing a vertical profile making it possible to re-engage the mode of vertical following of the trajectory on the rejoining profile. In parallel, the deflection of the altitude of the aircraft in relation to the reference vertical profile can be continuously calculated. This item of data can be displayed to the pilot, so as to allow him to verify that the vertical trajectory of the aircraft does indeed converge towards the reference vertical profile.

On completion of step 340 of assigning the prediction of the vertical profile, the method 300b comprises a step 380 of testing the type of vertical guidance mode which may be of managed or non-managed type.

On completion of step 380 of testing the type of vertical guidance mode engaged, if the managed vertical guidance mode has been re-invoked, the method is terminated and the aircraft follows the reference vertical profile. On the other hand, if, on completion of step 380 of testing the type of vertical guidance mode engaged, the managed vertical guidance mode has not been re-invoked, the method 300b comprises a return to step 302b of determining an initial state of the aircraft, so as to undertake a new iteration of the vertical-profile rejoining prediction calculation. Indeed, the aircraft not being in managed mode, it may have deviated from the rejoining vertical profile, and it is then necessary to recalculate a rejoining vertical profile.

FIGS. 4a, 4b, 4c, 4d, represent four examples of climb phase rejoining profiles calculated by a method according to one embodiment of the invention.

In these three figures, an aircraft 410 follows a vertical profile, defined by vertical constraints "AT OR ABOVE" 430, "AT" 431 and "AT OR ABOVE" 432. Subsequent to an unanticipated event such as a tailwind stronger than expected, the aircraft 410 has missed the vertical constraint 430, its altitude at the level of the constraint 430 being less than the minimum altitude defined by said constraint "AT OR ABOVE" 430.

In one embodiment of the invention, the calculation of a vertical-profile prediction in order to comply with a constraint in step 320 is performed in the climb phases according to a flight preset prediction comprising:

If the altitude of the aircraft is greater than the altitude previously predicted at the same point, reducing the engine thrust so as to decrease the angle of incidence of the aircraft to the minimum value making it possible to comply with the constraint, while preserving the speed of the aircraft. This scheme makes it possible advantageously to rejoin the constraint without requiring a dwell phase;

If the altitude of the aircraft is less than the altitude previously predicted at the same point, by performing successively:
1) If the engine thrust is not at the normal continuous maximum thrust value, an increase in the engine thrust up to this value;
2) If the engine thrust is already at the normal continuous maximum thrust value, or if the increase in the engine thrust up to this value is not sufficient to validate the constraint, and if the speed guidance mode is automatic, by reducing the speed down to a minimum limit safety speed, or until an aircraft slope sufficient to satisfy the constraint is obtained;
3) If the increase in the engine thrust up to the continuous maximum thrust value and the reduction in the speed down to the minimum safety speed are not sufficient to satisfy the altitude constraint, this constraint is considered to have been missed, and step 360 of verifying the existence of a following altitude constraint is activated.

Figure 4A:
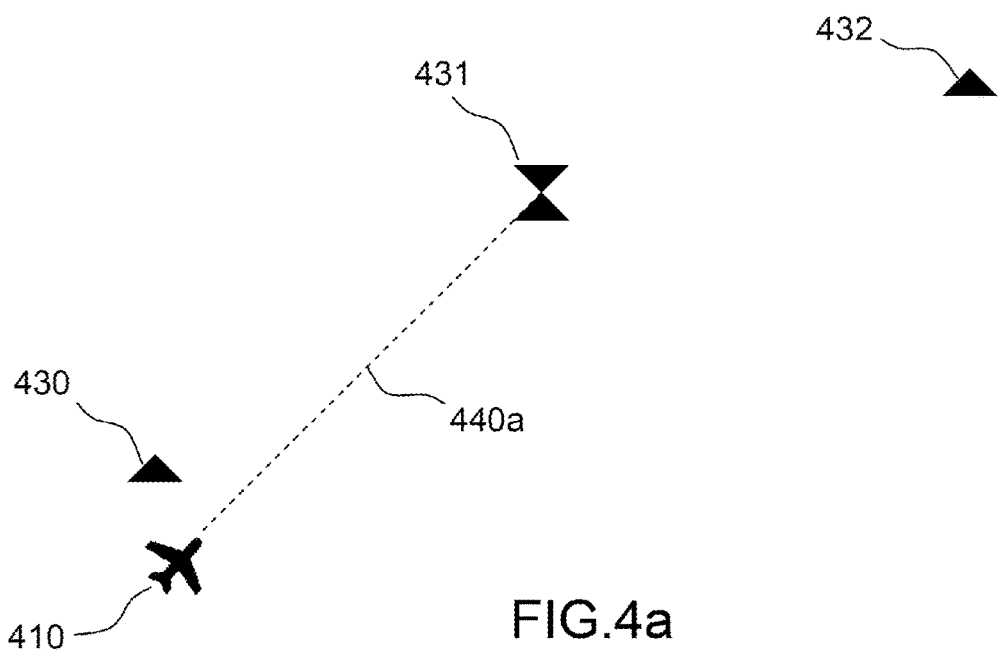
FIGS. 4a, 4b, 4c, 4d, four exemplary rejoining profiles in the climb phase, calculated by a method according to one embodiment of the invention.

FIG. 4a represents an exemplary rejoining profile in the climb phase calculated by a method according to one embodiment of the invention.

In this example, a method according to the invention selects, in step 310, the constraint 431 as altitude constraint to be complied with. Indeed, the position of the aircraft is that of the constraint 430. The latter is therefore considered to have already been missed. Step 320 is thereafter activated so as to calculate a vertical-profile prediction making it possible to comply with this constraint. In one embodiment of the invention, such as defined hereinabove, this vertical-profile prediction is calculated according to a flight preset prediction consisting in increasing the engine thrust and then, if this increase in the engine thrust is not sufficient to comply with the constraint 431, in decreasing the speed of the aircraft so as to increase the angle of incidence of the latter, so as to comply with the constraint.

In the example illustrated in FIG. 4a, the combination of the increase in the thrust of the engine and the decrease of the speed of the aircraft is sufficient to comply with the constraint 431, while complying with the safety limits defined by the flight envelope of the aircraft. Compliance with the constraint 431 is therefore validated in step 330, and the vertical-profile prediction assigned to the FMS. The aircraft will therefore follow the vertical profile 440a thus defined, so as to rejoin its reference vertical profile at the level of the constraint 431 and switch back to managed guidance mode.

Figure 4B:
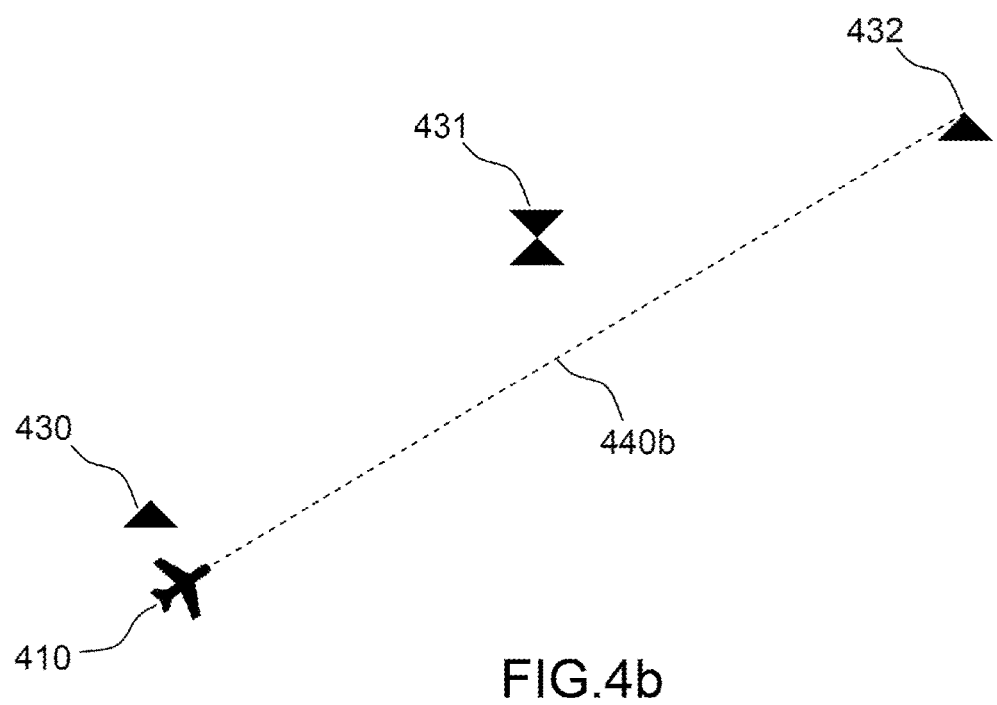

FIG. 4b represents an exemplary climb phase vertical rejoining profile calculated by a method according to one embodiment of the invention.

In this example, the combination of the increase in the thrust of the engine and of the decrease in the speed of the aircraft is not sufficient to comply with the constraint 431 while remaining in the flight domain of the aircraft. The constraint 431 is then identified as unsatisfied, and the constraint 432 identified as following altitude constraint to be satisfied.

The combination of the increase in the thrust of the engine and of the decrease in the speed of the aircraft is sufficient to comply with the constraint 432 while remaining in the flight domain of the aircraft. The vertical-profile prediction thus obtained therefore makes it possible to rejoin the constraint 432 according to the slope 440b just sufficient to satisfy the constraint 432. After having reached the location of this constraint, the aircraft can switch back to managed mode so as to be slaved to the remainder of its vertical profile.

Figure 4C:
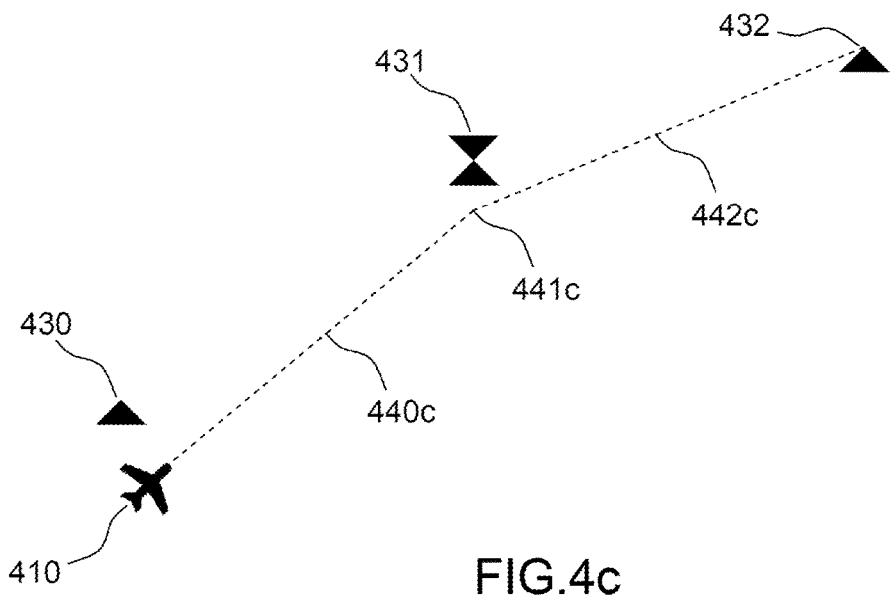

FIG. 4c represents an exemplary climb phase vertical rejoining profile calculated by a method according to one embodiment of the invention.

In a manner similar to FIG. 4b, in this example the combination of the increase in the thrust of the engine and of the decrease in the speed of the aircraft is not sufficient to comply with the constraint 431 while remaining in the flight domain of the aircraft. The constraint 431 is then identified as unsatisfied, and the constraint 432 identified as following altitude constraint to be satisfied.

In this embodiment, the vertical-profile prediction making it possible to approach as closely as possible to the constraint 431 is applied as far as the latter, and saved. In this example, an engine thrust preset at the normal continuous maximum thrust value, and a speed preset equal to the minimum safety speed are therefore applied, allowing the aircraft to follow the vertical trajectory segment 440c until the point 441c.

The prediction of vertical rejoining profile of the constraint 432 is calculated according to the same principles, starting from the predicted state of the aircraft at the point 441c. A prediction of guidance commands of the aircraft makes it possible to validate the altitude constraint 432, by flying the flight segment 442c, before switching back to managed mode.

Figure 4D:
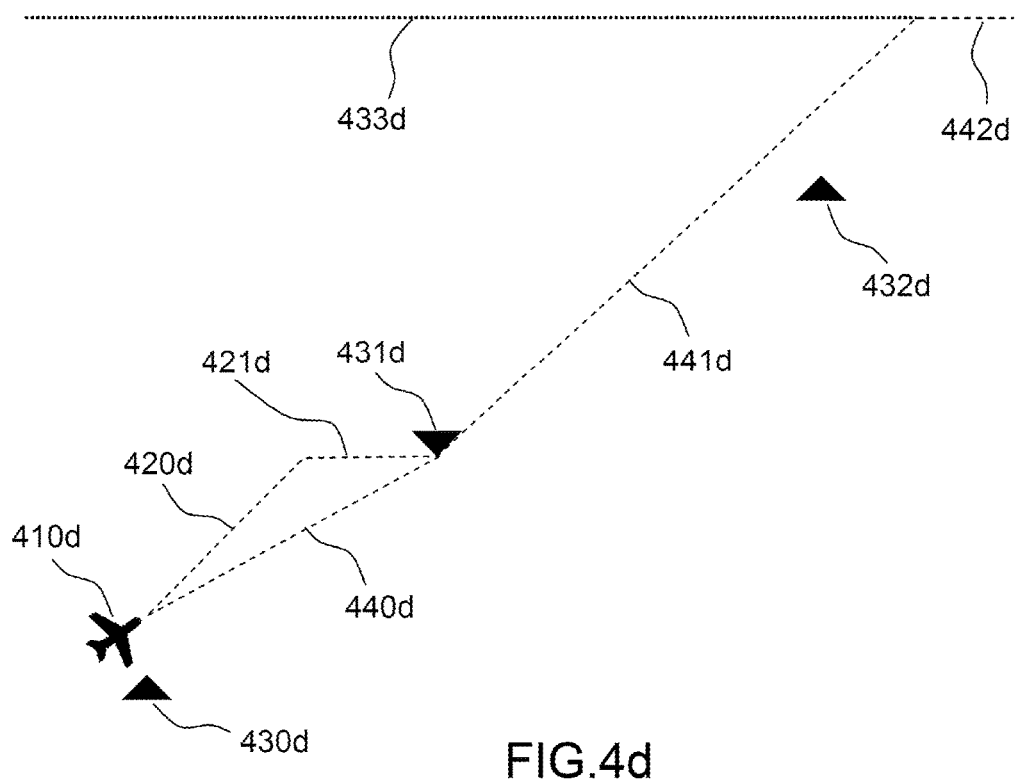

FIG. 4d represents an exemplary rejoining profile in the climb phase calculated by a method according to one embodiment of the invention.

In this example a climb vertical profile is represented by the constraints "AT OR ABOVE" 430d, "AT OR BELOW" 431d and "AT OR ABOVE" 432d, in order to reach a cruise level 433d. Subsequent to a tailwind ahead, the aircraft 410d climbs more quickly than anticipated and does not comply with the constraint 430d. A scheme according to the invention can be used to calculate a vertical climb rejoining profile 440d, 441d, before performing a cruise segment 442d.

On the contrary, a scheme according to the prior art would calculate a vertical rejoining profile comprising a climb segment 420d up to the altitude of the constraint 431d, and then a dwell segment 421d in order to rejoin the constraint. The segment 440d according to the invention makes it possible to comply with the constraint 431d in a more efficient manner than the two segments according to the prior art 420d, 421d. Indeed, the profile flown is closer to the initially anticipated profile. The rejoining profile according to the invention therefore makes it possible to limit a possible deviation in transit time at the various waypoints. Moreover, a rejoining profile according to the invention thus allows lower fuel consumption than a profile according to the prior art. This example demonstrates the ability of a method according to the invention to calculate vertical rejoining profiles that are more optimized than the methods according to the prior art.

Figure 5:
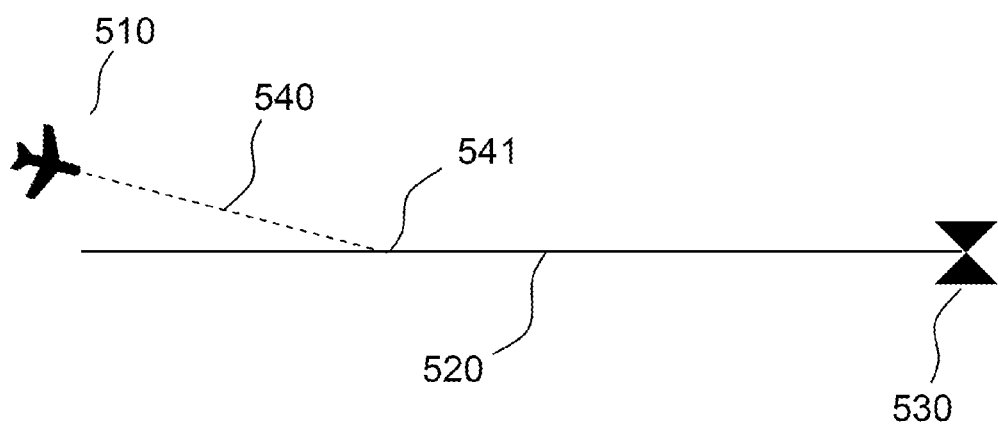
FIG. 5, an exemplary rejoining profile in the cruise phase calculated by a method according to one embodiment of the invention.

FIG. 5 represents an exemplary cruise phase vertical rejoining profile calculated by a method according to one embodiment of the invention.

The cruise phase 520 is characterized by a final altitude constraint 530 manifesting the anticipated cruise altitude of the aircraft throughout the phase 520. In a set of embodiments of the invention, a calculation of the vertical-profile prediction to validate a constraint in the cruise phase is performed according to a flight preset prediction comprising, if the altitude of the aircraft is greater than the anticipated cruise altitude, a preset of constant vertical speed, of maintaining the current speed, and of airbrakes non-extended configuration, called smooth configuration. In one embodiment of the invention, a predefined value is assigned to the constant rejoining speed, for example −1000 feet per minute, or of −500 feet. The predefined value may depend for example on the altitude of the aircraft.

In a set of embodiments of the invention, a vertical-profile prediction calculation to validate a constraint in the cruise phase is defined according to a flight preset prediction comprising, if the altitude of the aircraft is less than the anticipated cruise altitude, a preset of engine thrust at the continuous maximum thrust value, and of maintaining the current speed.

If this vertical-profile prediction makes it possible to reach the cruise altitude before the end of the cruise phase, it is applied until a rejoining point of the cruise altitude, at which the aircraft switches back to managed mode. In the converse case, the constraint is considered to have been missed.

The aircraft 510 represented in FIG. 5 is situated at an altitude greater than the altitude of the cruise phase 520. In one embodiment of the invention, the calculation of the rejoining vertical profile is performed according to a prediction of a preset of constant vertical speed at −1000 feet, of maintaining the current speed, and of airbrakes non-extended configuration, termed smooth configuration. In this example, this preset makes it possible to rejoin, on completion of a descent profile segment 540, the cruise segment 520 at the point 541. Once the point 541 has been reached, the aircraft therefore switches back to managed mode so as to follow the cruise segment 520 and the remainder of its profile.

Figure 6:
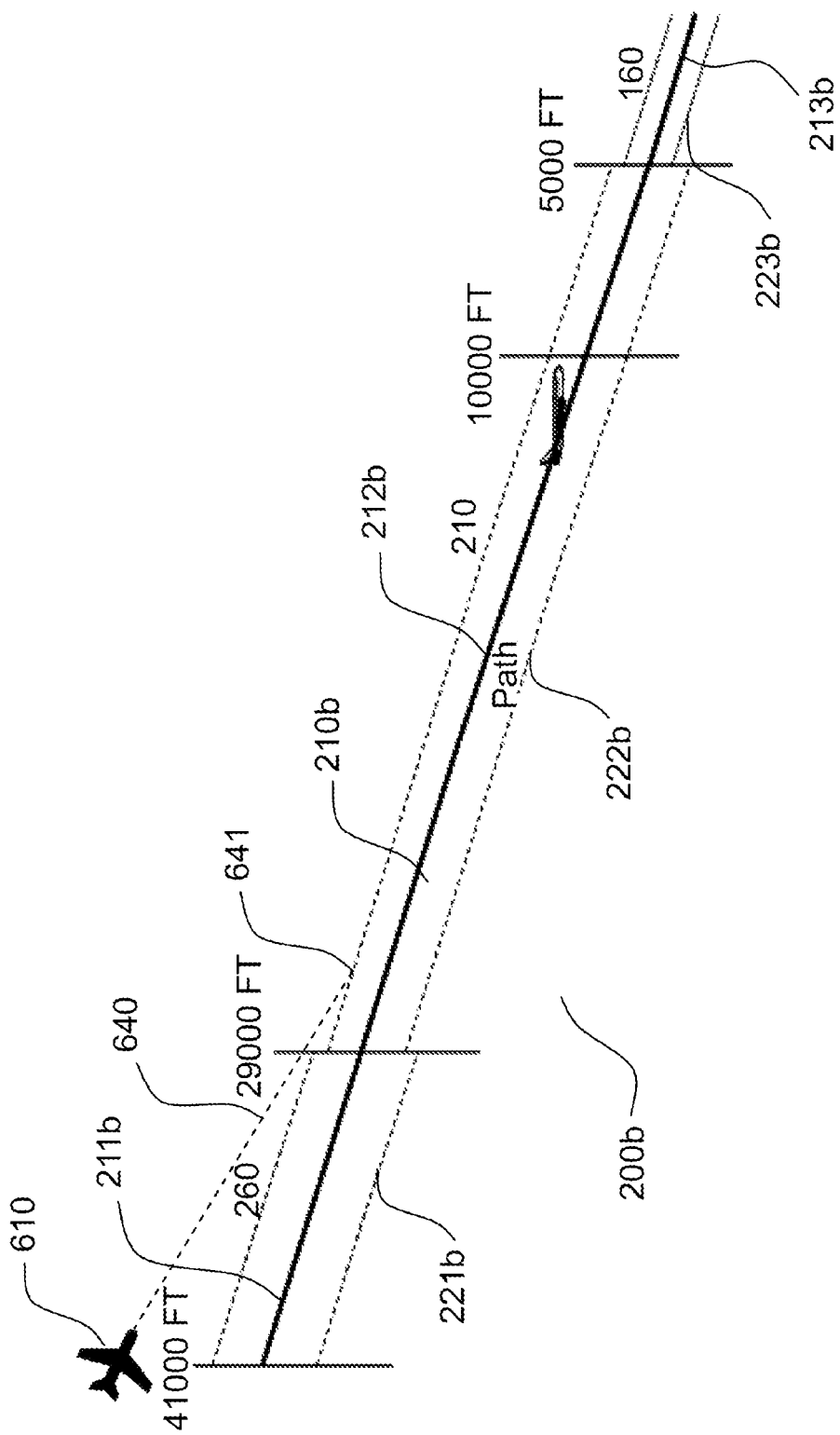
FIG. 6, an exemplary rejoining profile in the descent phase with performance management of VPPL type.

FIG. 6 represents an exemplary rejoining profile in the descent phase with performance management of VPPL type.

The descent profile segment represented in FIG. 6 is the segment 210b and the constraints 210b also represented in FIG. 2b, and comprising three sub-segments 211b, 212b and 213b, respectively associated with the distributed constraints of VPPL type 221b, 222b and 223b.

The altitude of the aircraft 610 is situated above the maximum altitude permitted by the constraint 221b, and the current guidance preset does not make it possible to comply with this constraint.

In a set of embodiments of the invention, an alert of deviating from the vertical profile is detected and displayed if a deviation between the current altitude of the aircraft and an altitude predicted on a descent reference vertical profile exceeds a certain threshold. In one embodiment of the invention, the deviating triggers an alert if this value is greater than a predefined threshold, for example 75 feet. In another embodiment of the invention, the deviating triggers an alert when the value of the deviation is greater than a safety margin defined by a tolerance of VPPL type.

In one embodiment, the calculation of a vertical-profile prediction to comply with a constraint in step 320 is performed in the descent phases by calculating a point of rejoining of the reference vertical profile by a vertical rejoining profile calculated according to a flight preset prediction comprising:

If the altitude of the aircraft is greater than the altitude defined at the same point by its reference flight profile, by performing simultaneously:
1) The assignment of an Idle thrust command to the engine (Idle signifying minimum usable thrust when the aircraft is in flight);
2) If the automatic speed mode is engaged, an assignment of a speed command greater than the anticipated speed, for example equal to the theoretical speed of the profile, plus a speed margin of 5 knots;
3) If the automatic speed mode is not engaged, an assignment of a speed command selected on the FCU;
4) A switch to airbrakes half-extended aerodynamic configuration;
   While passing through a step of transition at constant load factor between the current configuration and the rejoining-from-above configuration If the altitude of the aircraft is less than the altitude defined at the same point by its reference flight profile, a rejoining-from-below profile by performing simultaneously:
1) A rejoining of the reference profile, performed at constant vertical speed, optionally interspersed with dwells making it possible to comply with the intermediate constraining altitude constraints until rejoining the reference profile,
2) If the automatic speed mode is engaged, an assignment of a speed command equal to the theoretical speed of the profile, optionally limited to the next speed constraint if the latter occurs before the theoretical speed;
3) If the automatic speed mode is not engaged, an assignment of a speed command selected on the FCU;
4) A switch to the smooth aerodynamic configuration is used to calculate the reference vertical profile rejoining profile.

If these commands do not make it possible to rejoin the vertical profile before the altitude constraint, the latter is considered in step 330 as having been missed. In a set of embodiments of the invention, the vertical guidance mode managed by slaving of the reference vertical profile is re-engaged as soon as the deviation between the position of the aircraft and the reference vertical profile is less than a threshold. In one embodiment of the invention, this threshold has a predefined value, for example 75 or 150 feet. In another embodiment of the invention, the threshold is defined by a performance constraint of VPPL type, for example defined by the standard DO236C.

In the example described in FIG. 6, the application of the commands defined hereinabove makes it possible to define the vertical profile segment 640, which allows the aircraft to validate the VPPL altitude tolerances from the point 641. The managed mode can then be re-invoked as soon as the aircraft reaches the point 641.

Figure 7:
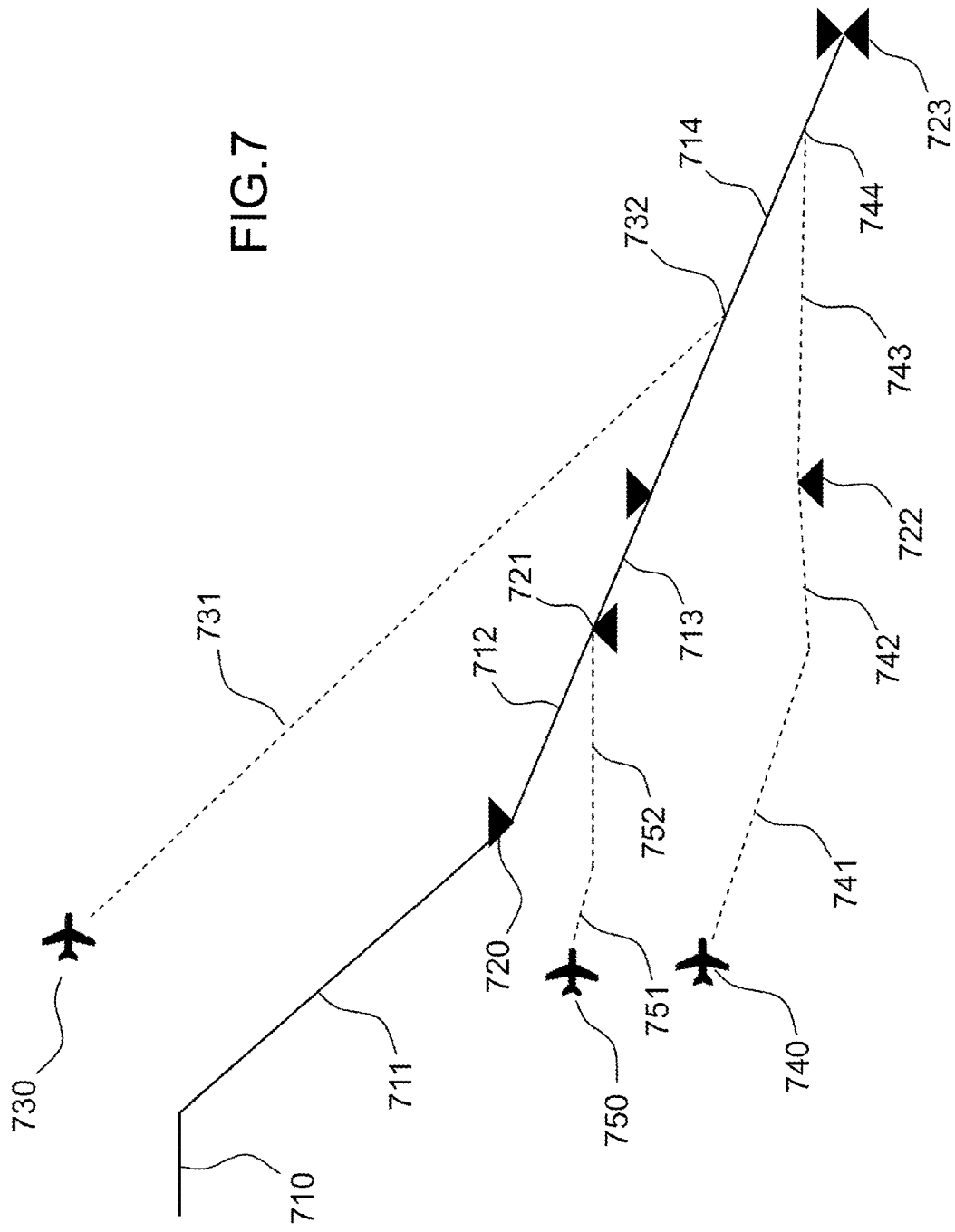
FIG. 7, two exemplary rejoining profiles in the descent phase, calculated by a method according to one embodiment of the invention.

FIG. 7 represents two exemplary rejoining profiles in the descent phase, calculated by a method according to one embodiment of the invention, for example the method 300b.

The reference vertical profile is manifested by the cruise segment 710 and descent segments 711, 712, 713, and 714 complying with the constraints "AT OR BELOW" 720, "AT OR ABOVE" 721, "WINDOW" 722, "AT" 723.

In a first example, the aircraft 750 is situated below the reference vertical profile. The altitude of the aircraft is already situated under the minimum altitude of the constraint 720. The constraint 721 is then selected as next vertical constraint to be satisfied, and a vertical-profile prediction making it possible to comply with it is calculated. This preset defines a descent at constant speed segment 751, and then a dwell segment 752. It makes it possible to comply with the constraint 721. Moreover, it makes it possible to rejoin the reference vertical profile at the level of the constraint 721. The reference vertical profile is then defined as the rejoining profile consisting of the segments 751 and 752, and then the remaining segments 713 and 714 of the reference vertical profile.

In a second example, an aircraft 730 is situated at an altitude greater than that defined at the same point by the reference vertical profile. A method according to the invention then calculates a rejoining-from-above profile, for example according to the embodiment described with reference to FIG. 6, for rejoining a reference vertical profile when the aircraft is situated above it. This trajectory 731 does not make it possible to comply with the constraint 720. Iteratively, the method 300b calculates a vertical-profile prediction to comply with the constraints 721 and 722, and then, in step 331b, compliance with the constraints 721 and 722 is not validated. A new iteration of the calculation is then launched so as to comply with the constraint 723. In this case, the vertical-profile prediction makes it possible to comply with the constraint 723, and to rejoin the reference vertical profile before the constraint 723, at the point 732. Step 341b is then activated, and the vertical profile of the aircraft is defined as being the rejoining-from-above profile 731 until the point 732, followed by the remaining portion of the segment 713 of the reference vertical profile.

In a third example, the aircraft 740 is situated below the reference vertical profile. The altitude of the aircraft is already situated under the minimum altitude of the constraints 720 and 721. A rejoining-from-below profile is therefore calculated so as to rejoin the constraint 722, for example according to the embodiment described with reference to FIG. 6, for rejoining a reference vertical profile when the altitude of the aircraft is situated below the reference profile. Initially, a vertical-profile prediction to comply with the constraint 722 is calculated, by forming successively a descent at constant speed segment 741, and then a dwell segment 742. This preset makes it possible to comply with the constraint 722, but not to rejoin the reference vertical profile. A new preset is then calculated to comply with the constraint 723. This preset defines a descent at constant speed segment 743, and makes it possible to comply with the constraint 723. Moreover, it makes it possible to rejoin the reference vertical profile before the constraint, at the point 744. The vertical profile thus formed therefore comprises the segments 741, 742, 743 of the rejoining profile until the point 744, and then the remaining portion of the segment 714 of the reference profile.

These examples demonstrate the ability of a method according to the invention to calculate a profile for rejoining a descent reference vertical profile, whether the aircraft is initially situated above or below the reference vertical profile.

In a set of embodiments of the invention, the vertical rejoining profile is displayed on the VD.

In a set of embodiments of the invention, an artificial waypoint indicates, on the ND and in a list of waypoints, the interception point where the rejoining of the reference vertical profile is anticipated.

The examples hereinabove demonstrate the ability of a method according to the invention to propose an adaptation of the vertical profile of an aircraft so as to rejoin a reference vertical profile of said aircraft. They are, however, given merely by way of example and in no case limit the scope of the invention, defined in the claims hereinbelow.

The invention claimed is:

1. A method for automatically adapting a vertical profile of an aircraft comprising:
    a step of selecting an altitude constraint to be complied with;
    a step of calculating a vertical-profile prediction allowing the vertical profile of the aircraft to have an altitude within a permissible range of an altitude defined by the altitude constraint at an altitude constraint position;
    a step of validating the vertical-profile prediction;
    if the vertical-profile prediction is validated, a step of assigning the vertical-profile prediction, said step of assigning the vertical-profile prediction comprising:
    sending an aircraft descent segment to an automatic pilot configured to send commands to actuators of the aircraft according to the aircraft descent segment, so that the aircraft follows the vertical-profile prediction,
    or displaying said aircraft descent segment to a pilot, receiving a subsequent flight command by the pilot and sending said flight command to the actuators of the aircraft so that the aircraft follows the vertical-profile prediction;
    otherwise:
        a step of determining an existence of a subsequent altitude constraint to be complied with;
    if the subsequent altitude constraint exists:
        a step of selecting the subsequent altitude constraint to be complied with;
        a return to step of calculating the vertical-profile prediction allowing the vertical profile of the aircraft to comply with said altitude constraint;
        otherwise, a step of applying an exit procedure.

2. The method according to claim 1, comprising, prior to step of selecting an altitude constraint to be complied with, a step of selecting a horizontal trajectory.

3. The method according to claim 2, wherein the step of selecting the horizontal trajectory comprises selecting an active lateral trajectory if managed lateral guidance is engaged, or selecting a rejoining trajectory if managed lateral guidance is not engaged.

4. The method according to claim 1, wherein the step of validating the vertical-profile prediction comprises a sub-step of validating compliance with the altitude constraint according to said vertical-profile prediction.

5. The method according to claim 4, wherein the altitude constraint is a pointlike constraint marking an end of a vertical climb segment, and step of calculating a vertical-profile prediction allowing the vertical profile of the aircraft to comply with said altitude constraint is performed according to a flight preset prediction comprising:
    if a predicted altitude of the aircraft is greater than said altitude constraint, a continuation of the climb up to an altitude of the constraint followed by a level-off of the aircraft as long as the altitude constraint is ahead of the aircraft;
    if a predicted altitude of the aircraft is less than said altitude constraint:
        an increase of an engine thrust up to a value allowing the vertical profile of the aircraft to comply with said altitude constraint or a maximum permissible value of a continuous engine thrust;
        if the increase of the engine thrust does not make it possible to comply with said altitude constraint, and if a speed-wise guidance mode is a managed mode, a reducing of the speed of the aircraft until obtaining a value of slope which makes it possible to obtain a smallest possible altitude difference between an aircraft altitude at the constraint and said altitude constraint, or a minimum permissible value of the speed of the aircraft.

6. The method according to claim 4, wherein said altitude constraint is a pointlike constraint marking an end of a vertical cruise segment, and the step of calculating a vertical-profile prediction allowing the vertical profile of the aircraft to comply with said constraint is performed according to a flight preset prediction comprising:
    if the altitude of the aircraft is situated above said altitude constraint, the calculation of a flight preset comprising maintaining of a current horizontal speed, and a predefined negative vertical speed;
    if the altitude of the aircraft is situated below said altitude constraint:
        a prediction of engine thrust at a maximum permissible value of a continuous thrust;
        a preset for maintaining a current horizontal speed.

7. The method according to claim 1, wherein the step of validating the vertical-profile prediction comprises a sub-step of validating a rejoining of a reference vertical profile, at the latest at the altitude constraint.

8. The method according to claim 1, wherein the vertical-profile prediction is a rejoining vertical profile for rejoining a reference vertical profile,
    and wherein said method comprises, prior to the step of assigning the vertical-profile prediction, a step of concatenating the vertical-profile prediction until a point for rejoining the reference vertical profile, and then of the reference vertical profile.

9. The method according to claim 1, wherein the exit procedure comprises a calculation of a last vertical-profile prediction, said last vertical-profile prediction consisting in:
    if the aircraft is in a climb phase, a prediction in respect of rejoining a cruise altitude;
    if the aircraft is in a descent or approach phase, a prediction in respect of rejoining a final approach point.

10. The method according to claim 1, wherein said altitude constraint to be complied with is a pointlike constraint.

11. The method according to claim 1, wherein said altitude constraint to be complied with is a distributed constraint spread over at least one sub-part of a vertical segment.

12. The method according to claim 11, wherein said altitude constraint is a safety margin with respect to a reference vertical profile in descent.

13. The method according to claim 1, wherein said altitude constraint is a pointlike constraint or a distributed constraint spread over a vertical descent segment, and the step of calculating a vertical-profile prediction allowing the vertical profile of the aircraft to comply with said altitude constraint is performed according to a flight preset prediction comprising:
    if a current or predicted position of the aircraft is situated above said altitude constraint, transition from a current configuration to a configuration for rejoining, said transition being performed at constant load factor and the configuration for rejoining being characterized by:
    a minimum thrust preset;
    a preset of semi-extension of airbrakes;
    if the current or predicted position of the aircraft is situated below said altitude constraint:
        a preset of transition at constant vertical speed;
        a preset from among a preset of smooth aerodynamic configuration and of aerodynamic configuration used to calculate a reference vertical profile in descent.

14. The method according to claim 13, wherein the step of validating compliance with the altitude constraint by the vertical-profile prediction comprises the calculation of a deviation between an altitude predicted on the vertical-profile prediction and an altitude predicted on the reference vertical profile in descent.

15. The method according to claim 14, wherein compliance with said altitude constraint is not validated if the deviation between the altitude predicted on the vertical-profile prediction and the altitude predicted on the reference vertical profile in descent is greater than a predefined threshold.

16. The method according to claim 13, wherein compliance with said altitude constraint is not validated if the altitude of the aircraft is situated outside of a safety margin with respect to the reference vertical profile in descent.

17. The method according to claim 1, comprising, when compliance with said altitude constraint is not validated:
    a step of assigning the vertical-profile prediction calculated in step of calculating a vertical-profile prediction allowing the vertical profile of the aircraft to comply with said altitude constraint;
    a storing of vertical-profile prediction until said altitude constraint;
    a reusing of a predicted state of the aircraft at said altitude constraint, according to the vertical-profile prediction stored during the return to step of calculating a prediction of a flight preset allowing the vertical profile of the aircraft to comply with the constraint.

18. A trajectory calculation system comprising a processor configured to perform an automatic adaptation of a vertical profile of an aircraft, said adaptation comprising at least:
    a step of selecting an altitude constraint to be complied with;
    a step of calculating a vertical-profile prediction allowing the vertical profile of the aircraft to have an altitude within a permissible range of an altitude defined by the altitude constraint at an altitude constraint position;

a step of validating the vertical-profile prediction;

if compliance with the vertical-profile prediction is validated, a step of assigning the vertical-profile prediction, said step of assigning the vertical-profile prediction comprising:

sending an aircraft descent segment to an automatic pilot configured to send commands to actuators of the aircraft according to the aircraft descent segment, so that the aircraft follows the vertical-profile prediction, or displaying said aircraft descent segment to a pilot, receiving a subsequent flight command by the pilot and sending said flight command to the actuators of the aircraft so that the aircraft follows the vertical-profile prediction;

otherwise:
a step of determining an existence of a subsequent altitude constraint to be complied with;
if the subsequent altitude constraint exists:
a step of selecting the subsequent altitude constraint to be complied with;
a return to step of calculating the vertical-profile prediction allowing the vertical profile of the aircraft to comply with said altitude constraint;
otherwise, a step of applying an exit procedure.

19. A computer program product comprising program code instructions recorded on a non-transitory computer-readable medium for automatically adapting a vertical profile of an aircraft when said program operates on a computer, said program code instructions being configured to:

select an altitude constraint to be complied with;

calculate a vertical-profile prediction allowing the vertical profile of the aircraft to have an altitude within permissible range of an altitude defined by the altitude constraint at an altitude constraint position;

validate the vertical-profile prediction;

if the vertical-profile prediction is validated, execute a step of assigning the vertical-profile prediction, said step of assigning the vertical-profile prediction comprising:

sending an aircraft descent segment to an automatic pilot configured to send commands to actuators of the aircraft according to the aircraft descent segment, so that the aircraft follows the vertical-profile prediction, or displaying said aircraft descent segment to a pilot, receiving a subsequent flight command by the pilot and sending said flight commands to the actuators of the aircraft so that the aircraft follows the vertical-profile prediction;

if the vertical-profile prediction is not validated:
determine an existence of a subsequent altitude constraint to be complied with;
if a subsequent altitude constraint exists:
select a subsequent altitude constraint to be complied with;
execute computer code elements configured to calculate the vertical-profile prediction allowing the vertical profile of the aircraft to comply with said altitude constraint;
if a subsequent altitude constraint does not exist, execute an exit procedure.

* * * * *